Figure 1:
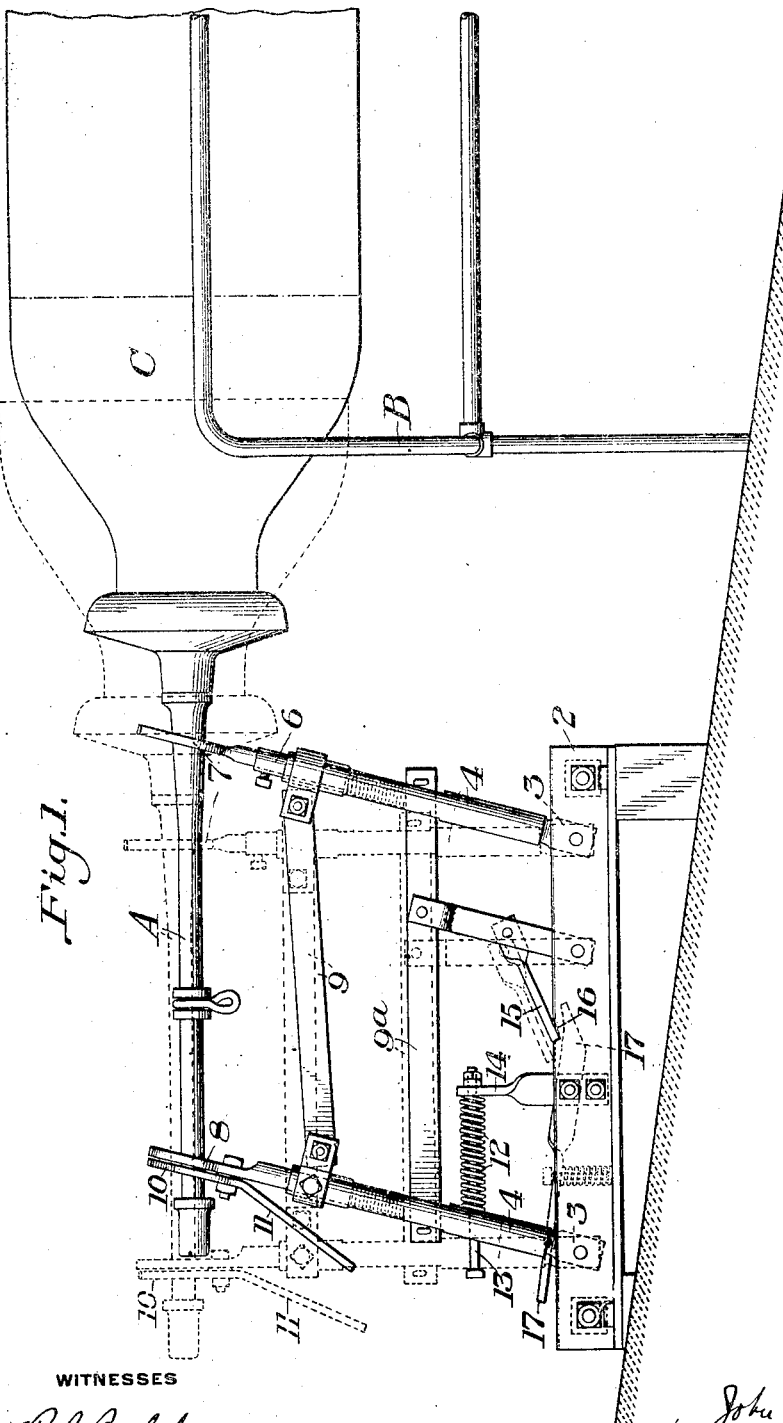

J. MURPHY.
BLOWPIPE STAND.
APPLICATION FILED MAY 4, 1912.

1,086,394.

Patented Feb. 10, 1914.
2 SHEETS—SHEET 1.

WITNESSES
R. A. Balderson
W. F. Amariss

INVENTOR
John Murphy
by Bakewell Byrnes & Parmelee
his attys

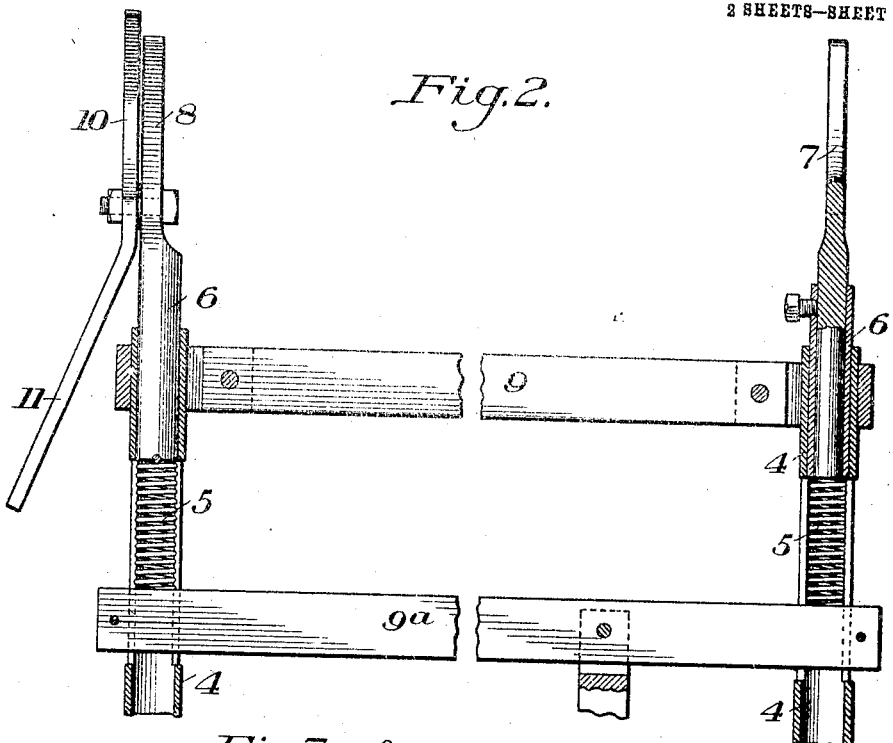
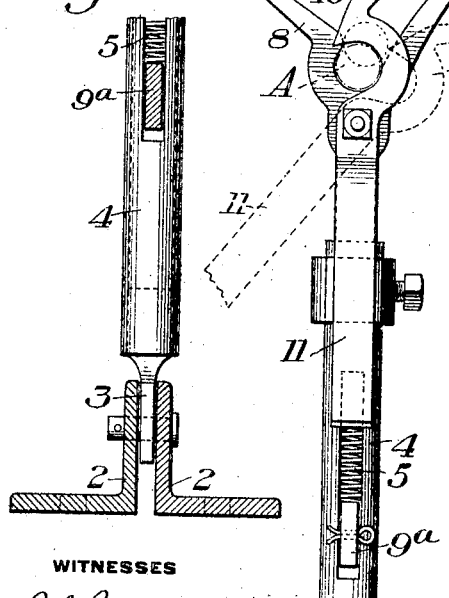
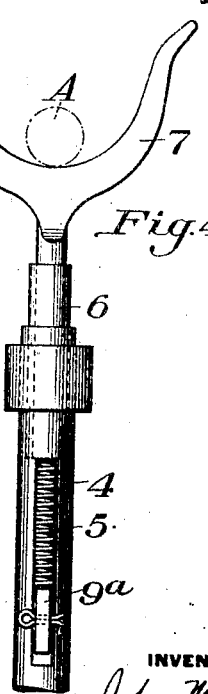

UNITED STATES PATENT OFFICE.

JOHN MURPHY, OF HARTFORD CITY, INDIANA, ASSIGNOR TO WINDOW GLASS MACHINE COMPANY, OF PITTSBURGH, PENNSYLVANIA, A CORPORATION OF NEW JERSEY.

BLOWPIPE-STAND.

1,086,394.  Specification of Letters Patent.  Patented Feb. 10, 1914.

Application filed May 4, 1912. Serial No. 695,186.

*To all whom it may concern:*

Be it known that I, JOHN MURPHY, a resident of Hartford City, Blackford county, Indiana, have invented a new and useful Improvement in Blowpipe-Stands, of which the following is a full, clear, and exact description, reference being had to the accompanying drawings, forming part of this specification, in which—

Figure 1 is a side elevation of my improved stand showing the same in operative position before the cracking off operation, and illustrating in dotted lines the position after cracking off; Fig. 2 is a sectional elevation of the upper portion of the stand, and Figs. 3, 4 and 5 are detail views hereinafter referred to.

In the capping off of glass cylinders drawn by a machine, the cylinder has been laid on the horse or support with the blow pipe or bait secured to and projecting from one end thereof. During the capping off operation it is important to impart a tension to one part of the circumference at the cap end in order to start the crack which severs the cap from the cylinder. It is also important to pull the cap away from the glass cylinder as the crack passes around in order to prevent checking and possible cracking and splitting of the whole cylinder. Heretofore these steps have been carried out by hand, one of the attendants giving a species of prying or lever action to the blow pipe to impart a tension to one side of the cylinder and start the crack, caused usually by a hot wire or hot thread of glass. This attendant also in this prying action imparted a pulling action to the cap as the glass was cracked around the cylinder.

My invention is designed to provide an apparatus for carrying out one end preferably both of these actions, thus avoiding the need of an attendant to support and actuate the blow pipe during capping off.

In the drawings, 2, 2 represent a pair of angle irons secured with their vertical flanges spaced apart slightly to receive the pivoted lower ends 3, 3 of the swinging standards 4. Each of these standards is preferably of telescoping form, comprising a tube 4 containing a spiral spring 5 pressing upwardly on the lower end of the inner sleeve 6, which has adjustably secured therein the fork 7 or 8. The standards are connected by an upper pivotal link 9 and a lower bar 9ª extending through slots below the springs. The fork 7 nearest the bait and cylinder is of plain form, as shown in Fig. 4, while the other fork has unsymmetrical arms as shown in Fig. 3, and is provided with a pivoted dog 10, which is pushed back by the entering blow pipe A, but is swung into place by the gravity of its depending weighted portion 11, when released. The pivoted frame thus formed is biased to vertical position by a compression spring 12 surrounding a stem 13 extending through the back standard and through a bracket 14 secured between the two base angles.

In using the device, it is secured in line with the horse B and adjacent to the end thereof, which receives the cap C of the cylinder. When the cylinder is to be lowered onto the horse, the tilting frame is pushed forwardly against the pressure of the biasing spring, until the cylinder is lowered onto the horse with the blow pipe resting in the forks of the stand and clamped by the gravity latch. The weight of the pipe and cylinder will hold the parts in this position, as shown in full lines in Fig. 1.

On account of the tilted position of the frame its biasing spring tends not only to move it away from the cylinder, but also to impart a lifting action which gives a tension to a part of the circumference of the glass cylinder. Therefore after the attendant has applied the hot wire and started the crack, this lifting action will aid in capping off and will also act to pull away the blow pipe and cap from the cylinder.

In order to avoid the need of manually holding the frame forwardly in the tilted position against the action of the spring. I may employ any suitable trip device for temporarily holding the stand in the receiving position shown in full lines in Fig. 1. In the form shown, a swinging latch 15 is adapted to engage a notch 16 in the base when the frame is tilted; and this latch may be detached by the foot-operated lever 17.

The advantage of my invention will be obvious to those skilled in the art, since the need of an attendant to support the blow pipe during capping off is avoided and the blow pipe automatically supported and drawn away from the cylinder, thus avoiding danger of breakage during the capping off operation.

Many changes may be made in the form and arrangement of the mechanical device employed, since I consider myself the first to provide a device of this character.

I claim:—

1. In capping-off apparatus for glass cylinders, a support for the cylinder, a separate movable support arranged to carry the bait or blow pipe while the cylinder is resting on its support, and means normally tending to separate the two supports; substantially as described.

2. In capping-off apparatus for glass cylinders, a support for the cylinder, a movable support for the bait or blow pipe while the cylinder is on its support, and means acting upon said movable support and tending to move it to another position during the cracking-off operation to thereby impart leverage action on the cap; substantially as described.

3. In capping-off apparatus for glass cylinders, a support for the cylinder, another support in line with the cylinder support and movable toward and away from the latter, and means acting upon the movable support to automatically move it away from the cylinder support; substantially as described.

4. In capping-off apparatus for glass cylinders, a supporting horse for the cylinder, a yielding support for the bait or blow pipe, and means acting upon the yielding support tending to automatically separate the supports; substantially as described.

5. In capping-off apparatus for glass cylinders, a support for the cylinder, a tilting support arranged to support the bait or blow pipe while the cylinder is on its support, and a spring connected to the tilting support and normally tending to move the latter to another position than that which it occupies during the capping off, whereby the support is caused to exert a cracking leverage upon the cap portion of the cylinder and also to pull the cap away from the cylinder after it has been cracked off; substantially as described.

6. In capping-off apparatus for glass cylinders, a support for the cylinder, a movable support in line with the cylinder support and having a plurality of forks arranged to receive the blow-pipe, and yielding means arranged to move said movable support relatively to the cylinder support after capping off; substantially as described.

7. In capping-off apparatus for glass cylinders, a support for the cylinder, a support for the blow pipe movable relatively to the cylinder support, and means connected to the movable support for imparting a tension thereto tending to separate the two supports and also to exert an upward prying action on the blow pipe and cap portion of the cylinder; substantially as described.

8. In capping-off apparatus for glass cylinders, a support for the cylinder, a movable support in line with the cylinder support, and having a plurality of forks, cushioning means for the forks, and means connected to said movable support and tending to normally move it away from the cylinder support; substantially as described.

9. In capping-off apparatus for glass cylinders, a support for the cylinder, and a separate support for the blow pipe or bait in line with the cylinder support, and means tending to separate said supports while the cylinder and the blow pipe or bait are supported thereon; substantially as described.

10. In capping-off apparatus for glass cylinders, a support for the cylinder, a pivoted support for the blow pipe or bait in alinement with the cylinder support, said movable support being arranged to be tilted to inclined position while supporting the blow pipe or bait, and means acting upon the movable support to tend to return it to upright position; substantially as described.

In testimony whereof, I have hereunto set my hand.

JOHN MURPHY.

Witnesses:
R. C. HEMMICK,
E. W. SWEET.